(12) United States Patent
Decker

(10) Patent No.: US 7,395,126 B2
(45) Date of Patent: Jul. 1, 2008

(54) REMOTE CONTROL OF WIRELESS ELECTROMECHANICAL DEVICE USING A WEB BROWSER

(75) Inventor: Stephen Edward Decker, Sunnyvale, CA (US)

(73) Assignee: Far Touch, Inc., Los Altos, CA (US)

( * ) Notice: Subject to any disclaimer, the term of this patent is extended or adjusted under 35 U.S.C. 154(b) by 204 days.

(21) Appl. No.: 10/630,639

(22) Filed: Jul. 29, 2003

(65) Prior Publication Data
US 2005/0027794 A1 Feb. 3, 2005

(51) Int. Cl.
G05B 19/18 (2006.01)
G05B 11/01 (2006.01)
G06F 15/16 (2006.01)

(52) U.S. Cl. .................. 700/65; 700/17; 709/230

(58) Field of Classification Search .......... 700/61, 700/64, 65, 83, 253, 86, 89; 706/44, 920; 709/201, 206, 230, 223, 250; 340/825.69, 340/825.72
See application file for complete search history.

(56) References Cited

U.S. PATENT DOCUMENTS

| | | | | |
|---|---|---|---|---|
| 6,188,325 B1 * | 2/2001 | Vogel | ............. | 340/825.69 |
| 6,445,964 B1 * | 9/2002 | White et al. | ............. | 700/61 |
| 6,575,802 B2 * | 6/2003 | Yim et al. | ............. | 446/91 |
| 6,640,140 B1 * | 10/2003 | Lindner et al. | ............. | 700/18 |
| 6,832,120 B1 * | 12/2004 | Frank et al. | ............. | 700/65 |
| 2002/0068983 A1 * | 6/2002 | Sexton | ............. | 700/2 |
| 2002/0133103 A1 * | 9/2002 | Williams et al. | ............. | 601/46 |
| 2003/0195441 A1 * | 10/2003 | Firouzgar | ............. | 601/46 |
| 2004/0260518 A1 * | 12/2004 | Polz et al. | ............. | 702/188 |

\* cited by examiner

*Primary Examiner*—Thomas K Pham
(74) *Attorney, Agent, or Firm*—Perkins Coie, LLP

(57) ABSTRACT

A system enabling one or more persons to control one or more wireless electromechanical devices located in remote locations. The system includes a first personal computer (10) equipped with an internet connection. The first personal computer uses a web browser with a graphical control panel that enables the user to input control requests, and that includes an animated representation of the electromechanical device(s) such that the user can instantly see the anticipated behavior of the electromechanical device. Control signals are sent via the internet to a server (30) which in turn forwards the signals to one or more second computers (50). The second computer(s) transforms the information and sends behavioral signals to a transmitter (100) via a USB link (60). The wireless transmitter sends the signals to a wireless receiver (200) which is connected to an electromechanical device (300). In this manner, a plurality of electromechanical devices can be controlled by one or more persons located in multiple remote locations.

18 Claims, 4 Drawing Sheets

REMOTE CONTROL OF WIRELESS ELECTROMECHANICAL DEVICE USING A WEB BROWSER

BACKGROUND

1. Field of Invention

This invention relates to the remote control of electromechanical devices using control signals that are created on any device having a web browser, transmitted via a communications network, received by computer, which in turn sends the control signals via wireless link to a remote controlled electromechanical device.

2. Prior Art

Because this invention draws upon several different technologies, each will be discussed separately. At the conclusion of this section, the reader will be able to review the discussion of the few inventions that most closely resemble the one set forth here.

Topic 1—Radio Controlled Devices

There is a significant body of prior art which describes the remote control of an electromechanical device using radio waves as the medium to transport control signals. Typically these involve a set of servos and or motors that operate a battery powered mechanical device such as a miniature car or toy plane. The behavior of the mechanical device is remotely controlled by a portable battery powered control unit. Both the mechanical device and the control panel are equipped with an antenna. Control signals are created by manually adjusting a variety of knobs, levers, and switches on the control panel. The control panel converts these behavioral requests into analog signals and sends them via radio waves to the mechanical device. The mechanical device converts the radio waves into electrical signals which in turn control the servos and or motors that produce a behavior in the device.

Examples include:

| U.S. Pat. No. | Title | US Class/Subclass |
| --- | --- | --- |
| 4,168,468 | Radio Motor Control System | 340/825.63 |
| 4,248,011 | Steering for RC Car | 446/456 |
| 4,548,584 | Radio Controlled Mobile Device | 434/118 |
| 5,481,257 | Remote Controlled Vehicle w/Camera | 340/825.69 |
| 5,609,312 | Model Helicopter | 244/17.19 |
| 5,762,533 | Toy Vehicle with adjustable wheels | 446/466 |
| 5,816,352 | Remote Control Toy | 180/67 |
| 5,816,888 | Remote Controlled Vehicle | 446/456 |

All of these inventions, and the very many similar toys and devices available today, are highly limited in that:

1. in order to control the electromechanical device a person must have a physical control panel—meaning that control is not easily shared between a large number of people;
2. anyone using the control panel to control the electromechanical device must themselves be within a relatively short range (usually line of sight) of the device; and
3. the number of devices that an individual control panel can control is limited to the number of devices that can operate within the range of the transmitter.

In short, this control design does not scale to very large numbers of electromechanical devices, controllers, or human participants, and is also severely limited by distance.

Another significant limitation is the complexity of control signals that can be generated using a physical control panel. The signals that ultimately drive the actions of the remote controlled device are entered into the control panel using a variety of levers and switches. If the person controlling the device wants to repeat a particular set of actions, that person must repeat the physical act of moving the levers and switches on the control panel. In this manner, the user cannot "record" a set of behaviors for playback. Similarly, because the control information is generated and sent in real time, the user cannot record a complex set of commands at a slow speed and then "play-back" the set of signals at a higher speed.

In short, the control panel cannot remember what controls are being sent to the device, nor can it facilitate the entry of highly complex and numerous commands at a slower speed for playback at a higher speed.

Topic 2—Computer Controlled Children's Toys

Advances in industrial technology have created exciting opportunities for the development of new and interesting children's toys.

One example of an electromechanical children's toy is the suite of products marketed under the trade name "Mindstorms™" from the wonderful people at LEGO®. Lego Mindstorms include robotic and electromechanical control components that enable people to build robots. The control information, or programming, for these robots is done on a personal computer and then uploaded to the robot. This technique provides the robot with a set of behaviors that can be triggered by elements in the robot's surrounding environment. For example, a robot can be built that senses light or motion and then takes an action, like making a noise or firing a toy gun.

The heart of the LEGO system is the RCX microcontroller. The program for the chip is created on a personal computer using LEGO's proprietary programming code. This code is then sent from the computer using an infrared transmitter. An infrared receiver on the robot receives the program and stores it in the memory of the RCX microcontroller.

The RCX is connected to a variety to sensors on the robot. Sensors capture information about the environment and send the data to the RCX chip where it is processed. Based on the program running on the chip, the RCX will send out signals that in turn control motors, pneumatics, and other elements that make the robot behave in the desired way.

The Mindstorm products use an infrared beam of light to transmit information from the personal computer to the robot. Infrared communication has some significant limitations including:

1. very short range
2. a direct line of sight is required between sender and receiver because, unlike radio waves, light will not pass through walls or around corners The Mindstorm products are not intended to be remotely controlled. Once the code is downloaded to the robot, it behaves in a completely autonomous manner. If the user wants to change the behavior of the device, she or he must return to the computer, rewrite the code, reload the code onto the robot, and then continue.

In addition to the LEGO example described above, there are several prior art examples of patents that combine personal computers and interactive toys. Examples include:

| U.S. Pat. No. | Title | US Class/Subclass |
| --- | --- | --- |
| 4,548,584 | Computer controlled mobile device | 434/118 |
| 4,846,693 | Video Based instructional entertainment system using an animated figure | 434/308 |
| 5,636,994 | Interactive Computer Controlled doll | 434/308 |

-continued

| U.S. Pat. No. | Title | US Class/Subclass |
|---|---|---|
| 5,733,131 | Education/Entertainment device | 434/307 |
| 5,746,602 | PC peripheral Internet Toy | 434/169 |
| 5,752,880 | Wireless interactive doll | 463/1 |
| 5,977,951 | System and method for substituting an animated character when a remote control character is unavailable | 345/156 |
| 6,319,010 | PC peripheral interactive doll | 434/169 |

U.S. Pat. No. 4,548,584 provides for "Computer control of a mobile device" where the device uses a micro-controller which in turn controls the motors and associated behavior of the device. Unlike the Lego product, the "Computer controlled mobile device" described in U.S. Pat. No. 4,548,584 remains tethered to the computer via a cable approximately of approximately "16 feet or 5 meters". U.S. Pat. No. 4,548,584 from the section entitled "Electrical/Electronic". This constant communication link between computer and device is in some respects an improvement over LEGO, however, the device is limited in that:
  1. the range and mobility of the device is limited by the length of the cable;
  2. only one person can control the device at a time;
  3. the person controlling the device must be in the same room as the device; and
  4. programming the device to perform tasks is accomplished by writing software and commands that can be interpreted by the microcontroller; and
  5. the mobile device cannot be controlled from a web browser.

U.S. Pat. No. 4,846,693 describes a "video based instructional entertainment system" in which the eyes and mouth of an animated doll (such as a toy bear) move in response to audio signals. In this invention, a control box is connected to a conventional videocassette recorder. Electromechanical control signals are scripted to match actions and images in a movie or presentation. Both elements are encoded on video tape. When the tape is played in said cassette recorder, the control box interprets the control signals to control an attached doll. In this manner the illusion is created that the doll is having an animated conversation with the video image.

While this invention does suggest use of a keyboard that would provide local real-time control of the toy, this invention is limited in that:
  1. a lack of wireless control limits the mobility of the doll
  2. the control signals reside on a video tape or CD and do not provide for remote control
  3. the solution does not provide for control of the device by a person in a different location
  4. the device is not being directly controlled by a person and, as a result, can only execute pre-programmed actions.

U.S. Pat. No. 5,636,994 describes an "interactive computer controlled doll" whereby a toy doll is connected to a computer. A computer program originates control signals that are in turn sent to a micro-controller which sends electromechanical control signals to various motors in a toy doll. "A program source such as a CD-ROM contains information which is processed by the computer." U.S. Pat. No. 5,636,994 from the section entitled "Abstract". In other words, the control signals are all predetermined and stored on media. The invention does suggest the use of a wireless communication link, however, all of the control signals originate from a locally hosted software program and not from a person. As a result, this invention has the following limitations:
  1. control cannot be shared between a large number of people;
  2. control cannot be easily shared between multiple computers;
  3. this solution does not easily scale to control very large numbers of dolls in multiple remote locations; and
  4. the doll cannot be controlled from a web browser.

U.S. Pat. No. 5,733,131 describes an "education and entertainment device with dynamic configuration and operation" in which information about current events (weather, financial news, entertainment information) is sent via a Gaskill paging system or similar one-way communication link) to receivers embedded in dolls and/or small toys. This invention does provide for control signals to originate in a remote location and be sent to large numbers of devices. For example, a large number of "weather bears" will individually report the weather of the region in which they are located. U.S. Pat. No. 5,733,131 from the section entitled "Detailed Description of the Preferred Embodiment". In addition, this invention provides for individual devices to be remotely controlled in a limited fashion by human beings. More specifically, the invention suggests that a person could push buttons on a telephone requesting a particular behavior. The signal is then sent through the public switched telephone network and ultimately to the toy. The request could cause the device to enunciate a specific phrase (e.g. a parent reminds a child to do homework, brush teeth, go to bed) or demonstrate a physical behavior.

While this is a clever invention, it has the following weaknesses:
  1. unlike the internet, the Gaskill paging system is a one-way communications link;
  2. control of a single toy cannot be easily shared among a large number of people;
  3. the individual generating the control signals has a very limited set of choices;
  4. the control interface (phone) does not provide a visual representation of the actions of the toy;
  5. the person controlling the toy does not know when their request is executed;
  6. they cannot see the result of their request unless they can actually see the device being controlled; and
  7. the device cannot be controlled from a web browser.

U.S. Pat. No. 5,746,602 describes a "PC peripheral interactive doll" for teaching and educating a child using an interactive doll with a wireless link to a personal computer. In this invention, scripted data is stored on a computer. The doll captures feedback from the child and sends information back to the PC. The software running on the PC determines what actions should be taken and then transmits motion and action scripts that drive additional subsequent behavior of the toy. The patent does suggest that the toy could have "access to mass storage devices and remote databanks through digital and analog communication links" U.S. Pat. No. 5,746,602 from the section entitled "Background of the invention". While this implies access to remote databases via the internet, the local computer that is connected to the toy is the entity controlling the toy. The patent describes an alternate embodiment in which the computer receives audio signals from a person on a telephone in a remote location, but it does not describe a graphical interface that could be used by a person or persons for controlling the toy from afar. As a result, this invention has the following limitations:
  1. control cannot be shared between a large number of people;

2. control cannot be easily shared between multiple computers;
3. it does not scale to provide control of large numbers of devices situated in multiple remote locations;
4. the invention does not allow for the person controlling the device to have fine grain control over the physical behavior of the toy; and
5. the doll cannot be controlled from a web browser.

U.S. Pat. No. 5,752,880 describes an "Interactive Doll" where two toys are controlled by a computer system via radio (wireless) links. In this invention multiple toys respond to a plurality of input techniques including voice command and the use of a graphical interface. While this system allows for the control of multiple devices using a graphical interface it does not provide for remote control via the computer networks nor does it include the sharing of control between people in multiple remote locations.

U.S. Pat. No. 5,977,951 provides a "System and method for substituting an animated character when a remote control physical character is unavailable". This computer based system provides for an on-screen animated replica of a remote control device as a back-up when the remote control device becomes unavailable, but does not directly relate to the remote control of a wireless device via the internet.

U.S. Pat. No. 6,310,010 describes a "PC peripheral interactive doll" where a toy doll is connected to a computer. A computer program originates control signals that are in turn sent to a micro-controller which sends electromechanical control signals to various motors in a toy doll. These motors, in turn, cause the toy doll to move. While "data and routines available from the Internet are made available to the interactive doll," U.S. Pat. No. 6,310,010 from the section entitled "Description of the Preferred Embodiment". the control of the doll resides with the software. The device is not remotely controlled, but is controlled by the PC to which it is connected. Because the original control information is generated by a software program and not by a person in real time, this invention has the following limitations:
1. a person or individual cannot directly control the doll;
2. control cannot be shared between a large number of people;
3. control cannot be easily shared between multiple computers;
4. the responses of the toy are predetermined; and
5. the doll cannot be controlled from a web browser.

German Patent DE 3009-040 describes a device for adding the capability to transmit sound from a remote control to a controlled model vehicle. The sound is generated by means of a microphone or a tape recorder and transmitted to the controlled model vehicle by means of radio communications. The model vehicle is equipped with a speaker that emits the received sounds.

Topic 3—Robotics and Computer Controlled Puppetry

Robotics is another area that blends electromechanical control and computers. The following U.S. patents deal with systems that are used for computer driven control of electromechanical devices:

| U.S. Pat. No. | Title | US Class/Subclass |
|---|---|---|
| 4,825,136 | Mimetic function simulator | 318/568.1 |
| 5,493,185 | Method for animating a motorized puppet | 318/3 |

U.S. Pat. No. 4,825,136 discloses an apparatus for controlling a doll based upon storage and reproduction of analog and digital recorded signals. An attached recording device records, stores, and then transmits the electromechanical control signals that control servos on a puppet. Control cords connect the doll to the recording and playback device. This invention has several shortfalls. Specifically the invention does not:
1. provide wireless control of the device;
2. scale to large numbers of persons who want to share control of the puppet;
3. scale to control very large numbers of puppets;
4. scale to control puppets located in multiple locations; nor does it
5. allow the doll to controlled using a web browser.

U.S. Pat. No. 5,493,185 describes a "method for animating motor driven puppets (and the like) and apparatus for implementing the method". This invention provides the capability for a puppeteer to control multiple devices by remote control, whether wireless or by cable. The invention allows for the combination of both preprogrammed and spontaneous human generated control signals as well as for the recording and playback of complex tasks. While an improvement over the prior art, this invention has several shortfalls including:
1. because control signals originate with the computer connected to the puppet(s), the number of people who can control the puppet is limited to the number of people who can use the single computer. As a result, control of the puppet is not easily shared amongst a large number of people;
2. the invention does not easily scale to control very large numbers of devices located in multiple locations; and
3. the invention does not allow for the puppets to be controlled from a web browser.

Topic 4—Telepresence/Telerobitics

There are several examples of prior art that enable the remote control of a device from a great distance. The following prior art examples describe various means by which an electromechanical device can be controlled from a remote location.

The "Robotic Arm Project" at the University of Australia maintains a robotic arm that can be remotely controlled over the internet from their web site at telerobot dot mech dot uwa dot edu dot au. The arm is monitored by a webcam A webcam is a camera that is connected to the internet and that sends images, photographs, or video over the internet so that they can be viewed in a remote location, which enables the person controlling the arm to see what actions are being taken. Visitors to the university's web site can control the robotic arm and move colored blocks around. Overall, this has been a successful experiment with approximately 500,000 people having accessed the robotic arm between 1994 and 2000.

In order to control the arm, a user must download a java applet from the university. Control information for the arm is entered as text in the form of 3 dimensional special coordinates using an X, Y, Z notation with modifiers T and S controlling the acute angle of the robotic arm and the acute angle of the claw respectively.

Software at the University of Australia converts the commands entered via the Java Applet into electrical signals that in turn control the robotic arm.

In spite of its usage over the years, there are many elements which could be improved including:
1. the software that controls the arm is designed to operate in a non-commercial, low security environment (meaning that persons cannot control the device from a computer with standard commercial security measures in place e.g. a firewall);
2. the experiment uses a highly technical interface that requires the user to learn a great deal before the interface can be used;
3. the experiment uses a text based input technique and does not capitalize on the invention and wide use of the computer "mouse" to enable traditional "drag and drop" capabilities which are so common in interface design today;
4. in its current design, the system requires a physical (data cable) connection to the machine receiving the control information from the internet; and
5. perhaps most important, the system provides very poor user feedback regarding the current position of the arm—neither the arm nor the toy blocks are graphically represented in a format that makes it is easy for the user to decipher what is happening with the arm or the blocks. Data regarding the position of the arm can only be obtained by reviewing the text based command window and by viewing the time delayed image provided by the web cam.

The control applet is designed to be used in a non-commercial, low security environment consistent with educational use within a university campus. The Java applet requires a direct socket connection on TCP/IP ports 4444 and 4445 between the java applet and the university server. This means that persons using computers protected by a "Firewall" cannot control the robotic arm because Firewalls are designed to prevent traffic from flowing through these standard ports. To do otherwise would present a security risk to the company or community protected by the Firewall.

The user interface requires the user to decode the position of the arm based on 3 dimensional special coordinates provided in an X, Y, Z notation (e.g. a description of the current position of the arm might be "Robot Position=X=350 Y+480 Z=50 degrees T=17 degrees gripper open").

Because of the non-graphical text based method of entering control information, study and preparation is required for the user to understand how to determine the position of the arm and to enter information. The interface does not allow for the manipulation of a graphical or animated representation of the robotic arm.

In addition, once the control information has been entered, the user does not immediately know what the physical outcome of the control request was. The user must wait and see the results in the video window.

Lastly, and perhaps most importantly, in this and other similar examples, the device being controlled has no mobility—meaning it is physically tethered to a server. The result is that it cannot be easily moved within the space, or moved to another room without being disconnected.

Another example of Telepresence Technologies is The Puma Paint Project. Started at Villanova University, the project is currently being moved to Rodger Williams University in Rhode Island. Puma Paint allows the user to download a Java applet that accepts commands and control information that is in turn used to control a robotic arm located at Rodger Williams University. The robotic arm used by Puma Paint, is used to dip a paint brush into paint and then depress the brush against a physical canvas thereby enabling the user to paint a picture in a remote location. As with the Australian project, a web cam is pointed at the canvas thereby providing the user with a real time picture of the painting process.

The interface for Puma Paint is superior to that of the Australian project in that it is more graphical, however, Puma Paint still uses a set of 3 dimensional special coordinates provided in an X, Y, Z notation to describe the location of the robotic arm holding the paint brush. Similar to the Australian project, there are a number of text based user feedback elements that provide the user with complex and not immediately understandable feedback about the painting process (e.g. labels on the interface include "% acked?", "packet Q", "ack'd cmds" and similar phrases which are not immediately easy to understand).

Similar to the Australian project, Puma Paint is physically tethered to the machine receiving the control information from the internet. This prohibits greater mobility on the part of the device being controlled. For example, in its current form, Puma Paint could not be easily moved to another room in the university, nor could it be easily moved outside without using numerous lengths of computer cables.

Topic 4—Adult Entertainment Devices

There are a wide variety of massage and related devices designed to soothe and or stimulate areas of the body. Examples include:

| U.S. Pat. No. | Title | US Class/Subclass |
|---|---|---|
| 3,991,751 | Portable Vibrator | 12//36 |
| 5,470,303 | Massage Device | 601/84 |
| 5,911,686 | Male Sexual Aid | 600/38 |
| 6,110,102 | Vision of Love | 600/38 |
| 6,142,929 | Sexual Stimulation Apparatus | 600/38 |
| 6,280,403 | Massage Device | 601/70 |
| 6,203,491 | Adult Sexual Apparatus | 600/38 |
| 6,368,268 | Method and device for interactive virtual control of sexual aids using digital computer networks | 600/38 |

The most relevant example is U.S. Pat. No. 6,368,268 which describes a "method and device for remote control of a sexual aid via the internet. The invention describes computers with a radio transmitter for control of a wireless device, and a video camera so that the actions of the device can be viewed by a remote party controlling the device. The process described in the application requires the person who wishes to control the device to obtain and install a piece of software on a personal computer. While this invention provides for the remote control of a wireless device, the process has the following deficiencies:
1. the invention requires the user to obtain and install software—precluding the user from spontaneously controlling a device.
2. the manufacturer or provider of the invention must develop multiple versions of software to accommodate multiple operating systems and control devices;
3. the invention does not provide for an animated representation of the device being controlled. The result is that it must rely upon the video signal sent by the remote camera forcing the user to control a device she or he may not be able to see.

WebPower Inc. under the trade name "SafeSexPlus.com" markets and sells a device called "the SafeSexPlus adapter". The SafeSex Plus adapter has been mentioned on CNN, the Howard Stem Radio Show, Wired Magazine, and other publications. The device consists of a small beige plastic box . . . with suction cups on the back, two light sensors . . . and a port for your sex toy" "The Love Machines" article by Tricia Baldwin published by Salon.com To operate the SafeSexPlus adapter, the user loads software (included) onto his or her computer. When run, the software creates the image of a square on the screen that is half white and half gray. Using the suction cups, the user then affixes the plastic box over the section of the screen that displays the colored square.

A second person in a remote location uses similar software that generates a duplicate image of a white and gray square on their screen. Using a mouse, the remote user changes the color of the square from white to gray. The corresponding shift in the color of the square is sent back to the first via the internet.

The color changes are then reproduced on the display of the first computer. The changes in color are detected by the light sensors on the SafeSexPlus adapter (plastic box) hanging from the monitor via suction cups.

The changes in color are interpreted by the SafeSexPlus adapter, and the corresponding electromechanical control signals travel down a wire to the adult toy.

As a result, the intensity of the vibration in the toy is a controlled by a person in a remote location via the internet using a graphical interface.

While this invention provides for remote control of an electromechanical device via the internet, it has the following significant limitations:
1. the invention does not provide for wireless control of the device;
2. the suction cup is prone to "slide" on a computer screen's smooth surface thereby moving the light sensors out of position and preventing communication between the computer and the device;
3. the invention does not allow for two way communication between the screen and the SafeSexPlus adapter. A mono-directional information flow prevents the computer from detecting the presence of the SafeSexPlus adapter, and prevents the SafeSexPlus adapter from sending any kind of acknowledgement or error message if an input is incomplete, corrupted, or misunderstood;
4. the person controlling the device is required to download a small application or "applet" in order to control the device;
5. the device can not be controlled using a web browser; and
6. most importantly, interface does not provide a visual representation of the device being controlled.

Feelthe.net LLC markets a product called "Sexsations" under the trade name DigitalIntamacy.com. The Sexsations product enables someone to control an electromechanical device over the internet using a graphical interface.

The product provides a Java based graphical interface that is downloaded over the internet and is then used to control up to four electromechanical devices located in a remote location. The Java interface allows the person controlling the devices to specify the body location and the level of vibration to be applied. The control signals are captured by the Java applet and sent over the internet to someone in possession of the Sexsations hardware device. The hardware device is connected to a personal computer via a 9 pin serial port connection.

While this invention provides for remote control of an electromechanical device via the internet, it has the following significant limitations:
1. the invention does not provide for wireless control of the device;
2. the nature of the serial connection between the Sexsations hardware device and the computer requires the computer to be rebooted in order to recognize the device;
7. the person controlling the device is required to download a small application or "applet" in order to control the device;
8. the applet is very large (more than 5 Megabytes) and can take several minutes to download;
3. the device can not be controlled using a web browser; and
4. perhaps most importantly, interface does not provide a visual representation of the device being controlled.

Cyber-Vibe Inc. is currently developing a product that would allow for wireless control of a sexual device. However, like the Safe-Sex-Plus and Sexsations products noted above, their product requires the person controlling the device to obtain and install an application on their computer. A Cyber-Vibe device can not be controlled using only a web browser. Also, as with the Safe-Sex-Plus and Sexsations products, the control interface for the Cyber-Vibe product does not include a graphical representation of the toy being controlled. The result is that user feedback is dependent upon being able to see the device in a real-time video image. If the device leaves the camera's field of vision—the user's ability to control the device is impaired.

VR Innovations markets a product called the "Virtual Sex Machine". The product includes CD-ROMs or DVDs that contain video images and control signals. The product also includes a sexual stimulation device that can be connected to a computer using a standard 9 pin serial cable. When the DVD or CD-ROM is played, the computer displays the video images and relays the control signals to the sexual stimulation device. In this manner the sexual stimulation device is able to "respond" to the video images displayed.

This invention is limited in that it does not allow for real-time control by a person in a remote location; nor does it provide for wireless remote control of the device;

In summary, while prior art examples include a wide array of remote controlled devices, and a variety of techniques for controlling them, none allows the user to control the remote device using only a web browser. All of the prior art example require that prior to controlling a device the user obtain a physical control panel or piece of software—none allows anyone with a web browser to spontaneously take control of a wireless device. None include an animated representation of the device being controlled and, as a result, are highly dependant upon a video image to help them understand the result of their control requests.

OBJECTS AND ADVANTAGES

The purpose of the invention is to provide the most effective means of controlling electromechanical devices via a wireless link, where said devices are located in a single or multiple far away locations, and where said devices are controlled by a single person, or by several people each in a different location.

In addition, control of the device(s) is accomplished through the manipulation of a graphical interface where said interface includes an animation that emulates the behavior of the electromechanical device such that the person(s) controlling the device(s) can immediately understand the results of their manipulation and the corresponding behavior of the electromechanical device(s) without the need for visual access via a transmitted video image. The animated representation of the device being controlled provides for immediate feedback, to the person controlling the remote device negating the need for a video image or other means of seeing the results of the control requests.

In its preferred embodiment, the graphical control interface is highly intuitive and requires little or no instructions. By merely looking at the controls, the user should be able to intuit how to control the device in question. Graphical and animated switches, knobs, and buttons are used in conjunction with simple pictures and symbols.

When combined with a graphical representation of the device being controlled, the system promotes rapid learning because the user can immediately understand the results of a command or control request.

One element that makes the invention presented here far superior to the prior art is an intuitive interface that requires little training or explanation.

Lastly, the graphical controls described above reside complete with a web browser. Said another way—any digital device that can run a web browser (phone, next generation car dash board, kiosk) can control the device.

This last point eliminates the requirement for an applet to be downloaded and installed on the computer of the person seeking to control a device in a remote location.

Specifically, the invention has the following objects and advantages:
1. a system that allows a computer to assist in the control of an electromechanical device;
2. a method of wireless communication such that the electromechanical device is not physically tethered to the computer;
3. a system which allows control of large numbers of devices in separate remote locations;
4. a system which allows control of an electromechanical device to be shared by large numbers of persons in remote locations;
5. a graphical interface which assists the user in controlling the electromechanical device(s);
6. a graphical interface that operates within the requirements of a web browser—dramatically reducing the requirements of the device capturing the control; and
7. immediate graphical feedback presented to a person or persons controlling a single device (or multiple devices) in a remote location in the form of an animated representation of the electromechanical device(s) being controlled that emulates the actions and behavior of the physical device.

This combination of the above objects and advantages represents a significant advantage over the prior art.

For example, a significant limitation in the prior art field of Radio Controlled devices is the complexity of control signals that can be generated using a physical control panel. For example, because prior art radio controlled devices are controlled using physical levers and switches, if the person controlling the device wants to repeat a particular set of actions, that person must repeat the physical act of moving the levers and switches on the control panel.

Unlike prior art in the field of Radio Controlled devices, the invention described here has the following advantages:
1. persons controlling the device(s) do not need a physical control panel. The controls for this invention operate within a web browser—thus allowing anyone with a display device to assume control of the device;
2. the design of the system allows for all control signals to be centralized and managed such that control of any number of devices can shift between a very large population of users; and
3. the invention presented here is not limited by distance—devices and persons controlling them do not need to be in the same location.
4. The invention presented here would enable the user to "record" a set of behaviors for playback. Furthermore, the user can record a complex set of commands at a slow speed and then "play-back" the set of signals at a higher speed.—This record/playback capability enables the user to create complex and intricate combinations of control signals and then play them back at speeds that would be impossible for a human being to create in real time.

In short, this invention is far superior to prior art in the area of Radio Controlled devices because it can scale to accommodate a very large number of electromechanical devices, controllers, or human participants, and is not limited by distance.

The invention presented herein has several advantages over the prior art of Computer Controlled Children's toys including:
1. the system enables control of one or more devices to be easily shared between large numbers of people;
2. the system enables one or more people to share control of a single device;
3. the use of the internet or other public communications utility enables the device(s) and the person(s) controlling it to be separated by vast distances;
4. an easy to use graphical interface that provides an intuitive way for the person controlling the device to understand what to do;
5. a graphical representation of the device being controlled that provides instant visual and auditory feedback regarding the behavior of the physical device being controlled; and
6. a graphical interface that is designed to run completely within the constraints of the user's web browser. This allows for a high degree of compatibility across devices (Windows, UNIX, Apple, PalmOS) and does not require the user to download a special application.

As noted above, an object of the invention is to enable a single person to control a very large number of devices. This can be accomplished because the control information can be routed through a single point (for example a server on the internet) where the control information can be replicated and sent out to any number of devices.

Similarly, an object of the invention is to enable large numbers of persons to share control of a single device or of multiple devices. Again, this is accomplished through the routing of control information through a single point. Where several persons wish to influence the behavior of a single device, software can be used to facilitate the sharing of control. This can be accomplished in any number of ways. Example of how control can be shared include:

having control quickly move among the users in a "round robin" fashion or at random using each control request represent a "vote" for a particular behavior where the behavior is determined by the number of control requests "voting" for a particular behavior;

implementing a bidding system whereby users bid for control causing control to shift between users based on their willingness to spend money, or some kind of points in a closed (fictional) currency.

In addition, as noted previously, the invention presented herein enables a greater complexity of control signals to be created by users.

Perhaps the most significant advantage over the prior art in the field of Computer Controlled Children's Toys, is that the device is not merely following a pre-determined script that dictates the behavior of the device. Instead, the invention presented here receives direction from an individual person—a person who can use intuition and spontaneous insight to create a more rich and unique experience.

While the person controlling the device has a selection of "pre-set behaviors" available to them, they have the ability to shift quickly between these predefined behaviors and manual mode. As a result, each session where the device is used is unique.

In the prior art field of Robotics and Computer Controlled Puppetry, the inventions are highly limited in that they do not scale to large numbers of devices nor do they enable large numbers of people to control the devices. As previously stated, a major object and advantage of the invention presented here is the ability to have a very large number of people share control of a very large number of devices.

In the field of Teleprence and Telerobotics, the prior art examples are physically connected to computers with data cables, which limits the mobility of the devices being controlled. In addition, the prior art provides very poor user feedback regarding the position and configuration of the device being controlled and are overly reliant upon applications or "applets" that must be downloaded in order for someone to control the decide.

The invention presented here is superior to the prior art in the field of Teleprence and Telerobotics for the following reasons:

1. The invention uses a wireless link to send data to the device—providing for a more mobile and flexible device;
2. The invention does not require the use of a video image of the device being controlled;
3. The invention uses an interactive graphical interface that makes it easy for the user to quickly understand how to control the device. The graphical nature and simplicity of design are significant in promoting the ability of the invention to be used across many different cultures and languages;
4. The interface includes a graphical representation of the device being controlled which provides immediate visual and auditory feedback to the user regarding the impact of her/his control request and the corresponding change in the behavior of the device. A graphical simulation of the device being controlled, which emulates the actual behavior of the physical device being controlled, provides for better user feedback and learning; and
5. The invention presented here uses a graphical interface that is designed to run completely within the constraints of the user's web browser. This allows for a high degree of compatibility across devices (Windows, UNIX, Apple, PalmOS) and does not require the user to download a special application.

The invention presented here is also superior to the prior art in the field of Adult Entertainment Devices.

While there are several examples in the prior art that describe remote control of an electromechanical device, the prior art is limited in that each of the examples, they 1. do not provide a wireless connection between the computer and the electromechanical device(s); and
2. do not provide an animated graphical representation of the device being controlled.

The invention presented here is superior to the prior art in the field of Adult Entertainment Devices for the following reasons:

1. The invention uses a wireless link to send data to the device—providing for a more mobile and flexible device;
2. The invention does not require the use of a video image of the device being controlled;
3. The invention uses an interactive graphical interface that makes it easy for the user to quickly understand how to control the device. The graphical nature and simplicity of design are significant in promoting the ability of the invention to be used across many different cultures and languages;
4. The interface includes a graphical representation of the device being controlled which provides immediate visual and auditory feedback to the user regarding the impact of her/his control request and the corresponding change in the behavior of the device. A graphical simulation of the device being controlled, which emulates the actual behavior of the physical device being controlled, provides for better user feedback and learning and eliminates the requirement of a video image of the device being controller; and
5. The invention presented here uses a graphical interface that is designed to run completely within the constraints of the user's web browser. This allows for a high degree of compatibility across devices (Windows, UNIX, Apple, PalmOS) and does not require the user to download a special application.

The objects and advantages are not limited to those described above. Additional objects and advantages will become apparent from a consideration of the drawings and ensuing description.

SUMMARY

The system provides for one or more individuals to control one or more electromechanical devices where both the individual(s) and device(s) are each located in multiple remote locations. The system is comprised of one or more electromechanical devices, one or more wireless transmitters, one or more wireless receivers, and two or more computers that communicate via the internet, public switched telephone network, or other telecommunications utility.

The invention presented herein is superior to the prior art in that it:

uses a wireless link instead of a data cable;

provides the ability to control multiple devices in remote locations;

provides the ability for large numbers people to share control of a single device;

uses a graphical interface to capture control requests and educate the user on the immediate result of action taken by the device;

uses a graphical and intuitive representations of the controls for the device thereby minimizing the amount of text required to educate the user on its operations and promoting for portability across multiple languages.

provides an animated graphical representation of the device(s) being controlled;

requires that the person(s) controlling the device(s) need only a web browser and an internet connection—a special application is not required; and does not require a video image of the device being controlled.

DRAWINGS

FIG. 1 illustrates how control signals move from a first personal computer, through the internet, to a server, to a second personal computer where the information travels along a USB cable to a wireless transmitter and then finally on to a wireless receiver where the signals are passed on to a motor control circuit which controls an electromechanical device. It is important to note that the first "computer" can be a phone, Television, PDA, or any device capable of running a web browser.

FIG. 2 illustrates how control information input at the first computer can be sent via the internet to the server where the control information is replicated and sent to a plurality of second computers, where each second computer has a wireless transmitter which is sending a signal to a wireless electromechanical device. Note that in this illustration each of the multiple second computers is in a separate location from the first computer.

FIG. 3 depicts a single second computer receiving signals from a plurality of first computers.

FIG. 4 describes how computers can simultaneously assume the role of both first computer and second computer. In other words, this drawing illustrates how a computer can both send and receive signals to other computers which are also serving both roles. In this example, a computer provides a graphical interface which sends control signals and at the same time receives control signals and routes them to the attached transmitter and associated device.

REFERENCE NUMERALS USED IN FIGURES

Figure 1:
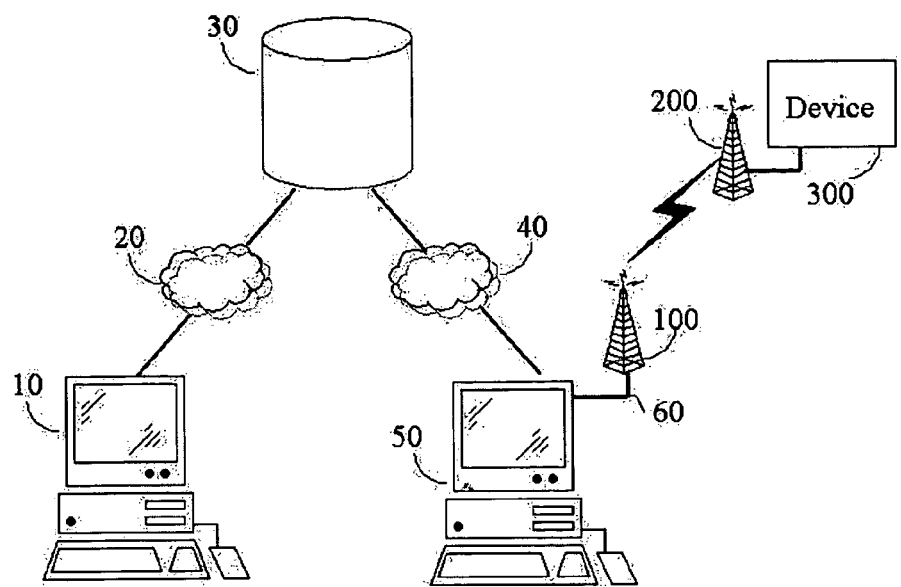

10 First Personal Computer, PDA, phone, or any device capable of running a web browser
20 Internet Connection
30 Server
40 Internet Connection
50 Second Personal Computer
60 USB cable
100 Transmitter
101 Transmitter USB interface module
102 Transmitter data decoder module
103 Transmitter UHF Transmitter module
200 Receiver
201 Receiver UHF receiver module
202 Receiver data decoder module
203 Receiver data latch
204 Receiver motor controller
300 Electromechanical Device

DETAILED DESCRIPTION

Hardware invention allows for someone using a web browser to control a wireless device in a remote location. The transmitter, receiver, and motor control modules together implement the wireless portion of this control path.

Transmitter

Figure 6:
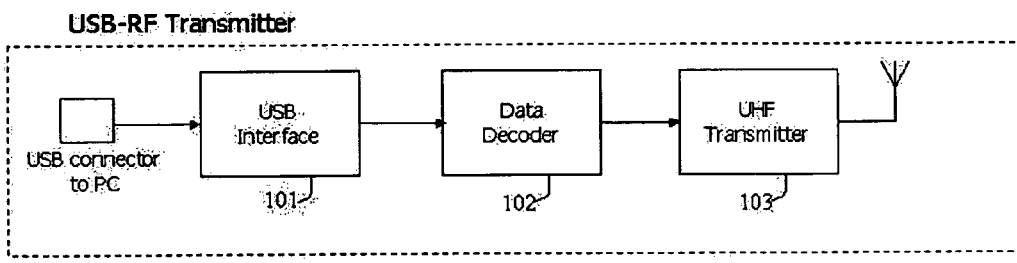
FIG. 6 is a block diagram showing the logical modules in the Transmitter.

As shown in FIG. 6, the transmitter is comprised of 3 modules: 101) USB Interface, 102) Data Encoder, and 103) UHF Transmitter.

Module 101 connects to the personal computer via an industry-standard Universal Serial Bus (USB) interface. In addition to receiving data, the transmitter module also draws power from the PC's USB interface.

Data is sent from the USB interface 101 to a data encoding module 102 that encodes the parallel data received from the USB module into a serial data stream.

The serial data stream from encoding module 102 is sent through a level converter, then to an RF transmitter 103.

Supporting components of the transmitter module include voltage regulators and a serial EEPROM containing the USB vendor and product ID.

In the preferred embodiment the transmitted RF signal is modulated by Amplitude Shift Keying (ASK) with a carrier frequency of 2.1 GHz and where the transmitting antenna is constructed as a PC board trace (eliminating the need for an external antenna).

Modules can be combined into discreet integrated circuits or, the functions can be carried out using dedicated chips. For example, the LINX TXE-433-KH, is a commercially available printed circuit board available from LINX Technologies 575 S. E. Ashley Place, Grants Pass OR 97526. Phone # (541)471-6256. The LINX chip combines both the transmitter 101 and encoder 102 modules in a single integrated circuit. In an alternate embodiment, these modules could be split among several chips. For example, Motorola produces several chips that provide RF transmission including the Holtek 6160 RF Transmitter. There are also chips that provide a dedicated encoding capability such the Motorola MC145026 encoder. Similarly, the encoder functionality could be provided using software residing on a simple microcontroller.

Receiver/Controller

Figure 7:
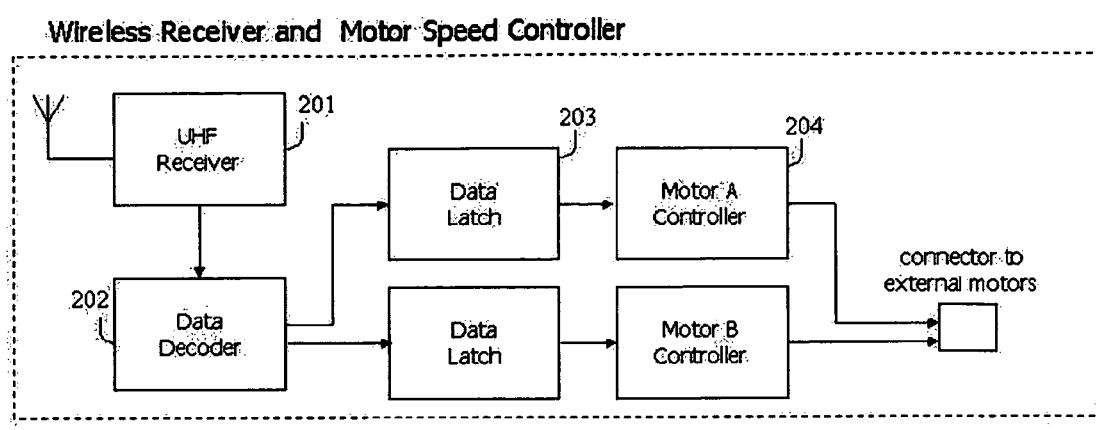
FIG. 7 is a block diagram showing the logical modules in the Receiver.

As shown in FIG. 7, the receiver/controller is comprised of 4 different modules including 201) UHF RF receiver, 202) data decoder, 203) Data Latch, and 204) motor speed controller. The receiver module can be powered internally by 4 AA batteries, or optionally by an external 6-volt DC power source.

The UHF antenna 201 receives the RF signal from the transmitter 100 and recovers the serial data stream. This serial data is then routed to a data decoder 202. The decoder compares the address portion of the incoming data with the settings of the address setting on the back of the receiver. If the address matches, the data is sent on to the data latches 203.

In the preferred embodiment, motor controller A is based on a timer chip that generates a pulse-width modulated (PWM) signal to regulate the speed of the external DC motors. The duty cycle of the PWM signal is determined by the discharge rate of the RC network. When the PWM signal is disabled, the external motor is turned off.

In the preferred embodiment the receiver will respond only to data sent by a transmitter with a matching address value. This allows multiple pairs of transmitters and receivers to operate within the same reception area.

DETAILED DESCRIPTION

Software

The software consists of several different components:
1. a graphical control interface
2. a graphical animation of the device(s) being controlled
3. "server side" control software
4. USB device driver The graphical control interface resides on first computer 10 (shown in FIGS. 1, 2, 3, 4, and 5). First Computer 10 might also be a "personal digital assistant" (PDA), kiosk, phone, and any other digital device capable of running a web browser.

The purpose of the interface is to accept and transmit control information. The user manipulates the controls to create the desired effect in device 300 (as shown in FIGS. 1, 2, 3, 4, and 5).

In its preferred embodiment, the graphical control interface is easy to understand meaning that with little or no instructions the user can immediately intuit how to control the device in question. Graphical and animated switches, knobs, and buttons are used in conjunction with simple pictures and symbols. In this manner, the user can look at the control panel and easily understand the result of pressing a switch, turning a knob, or pushing a button. One element that makes the invention presented here far superior to the prior art is an intuitive interface that requires little training or explanation.

In its preferred embodiment, the control panel is developed in Flash to optimize both the graphical richness of the user experience and to minimize the size of the file. In addition, a control panel written in Flash can write, manipulate, and send XML-encoded data to other applications.

The control panel accepts the user inputs (the manipulation of the graphical controls) and transmits the control signals to computer 50 (shown in FIGS. 1, 2, 3, 4, and 5).

In its preferred embodiment, the control signals are folded into an XML data structure. By abstracting the electromechanical control information to XML, the invention will be able to communicate with many different devices. For example, this design will allow alternate embodiments of the invention to communicate with many different devices (servos, switches, relays, etc.) in the future with little or no change to the server software.

An important part of the invention is the provision of a graphical animation of the device(s) being controlled. The purpose of the animation is to provide immediate visual and auditory feedback to the user regarding the current behavior of the device(s).

The provision of immediate visual and auditory feedback is superior to all of the inventions reviewed in the prior art. By combining the graphical control panel and animated graphical feedback, the user can easily understand what actions are available, input the desired behavior, and see the resulting behavior of the electromechanical device even if it is obscured from view.

The final software element is the "server side" control software which resides on computer 50 and receives the information sent from computer 10.

The server side software parses the XML encoded data structure and transforms the data into a format that can be sent to the USB transmitter device 60.

In an alternate embodiment, the server side software can forward the control information to another server where it can be recorded for billing or use analysis.

The final software element is the USB device driver. The USB driver enables computer 50 to communicate with Transmitter 100 via USB cable 60.

DESCRIPTION OF OPERATION

In the preferred embodiment, the graphical control panel resides on Server 30 (Pictured in FIGS. 1, 2, 3, 4, and 5).

An end user views the control panel using a web browser via internet connection 20 where it is displayed on computer 10.

The control panel serves a number of functions. Specifically the control panel:

1. provides a graphical control interface and accepts the user requests;
2. allows the user to input control requests by manipulating animated switches, knobs, buttons and the like;
3. captures the control requests;
4. embeds the information in an XML object;
5. transmits the XML object;
6. contains an animated image of the device(s) being controlled; and
7. displays the result of the control request by changing the behavior or the animated image such that the animated image mimics the behavior of the physical device being controlled.

By manipulating the controls on the graphical panel, and by viewing the animated image, the user can easily understand how to create a specific behavior in the electromechanical device 300.

The fact that the control panel contains an animated representation of the device being controlled eliminates the requirement for a video image of the device being controlled.

The control panel forwards the XML object via internet connection 20 to server 30 where it is routed via internet connection 40 to computer 50, as shown in FIGS. 1, 2, 3, 4, and 5.

Figure 2:
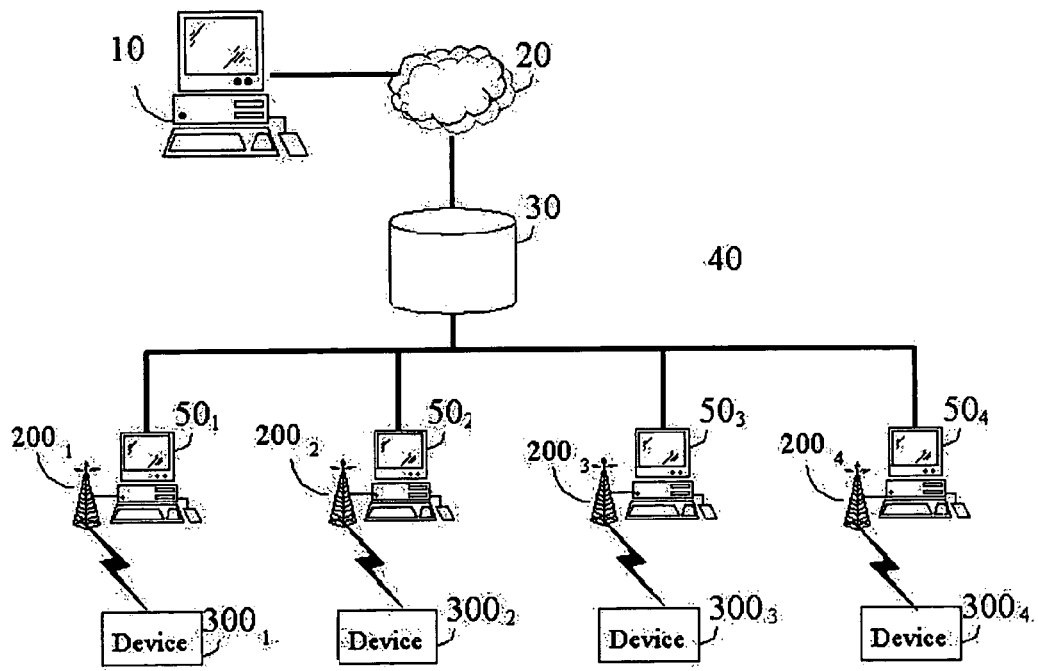

In an alternate embodiment, Server 30 replicates the control signals and forwards them to multiple computers as shown in FIG. 2.

Figure 3:
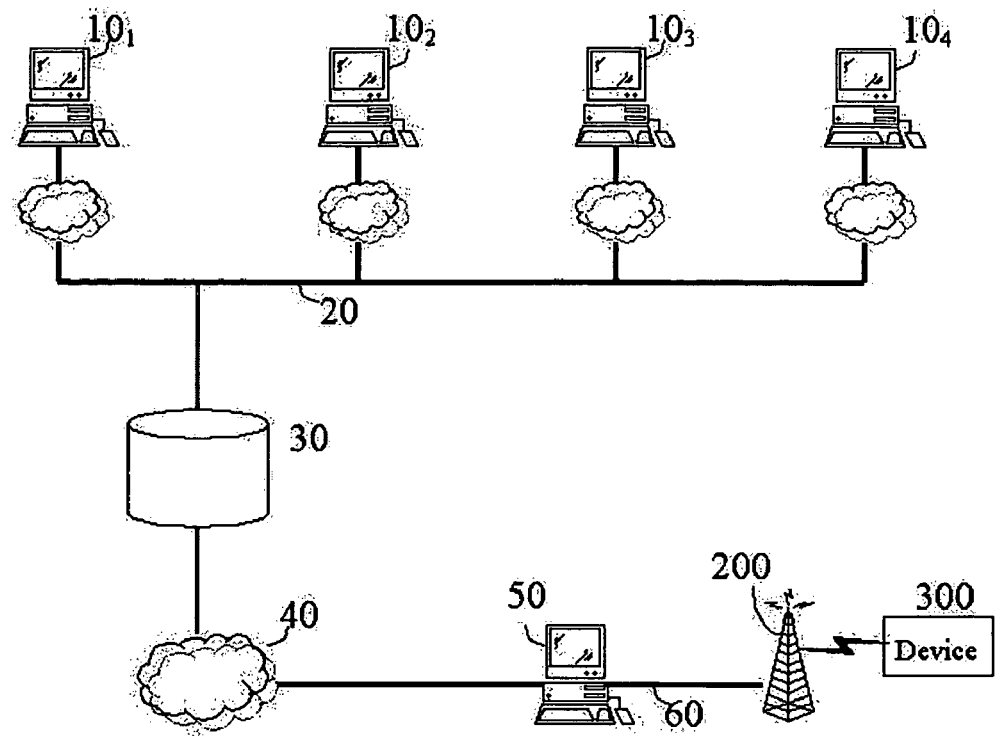

In an alternate embodiment, Server 30 manages the control requests from multiple users and forwards a subset of control information to computer 50 as shown in FIG. 3.

Computer 50 is running the server side software and is connected to Transmitter 100 by USB cable 60.

In alternative embodiments, the Transmitter 100 is physically housed within computer 50 and does not require USB cable and drivers.

Transmitter 100 sends the control signals via wireless link to Receiver 200. Any number of frequencies can be used depending upon the desired range between Transmitter 100 and Receiver 200.

Receiver 200 uses the control signals to set the speed of the motors in electromechanical device 300.

The nature of electromechanical device 300 is highly flexible and can be any mechanism with at least one motor.

Examples of electromechanical devices which may be controlled by the invention presented here include vehicles, boats, aircraft, toys, robotic devices (including stand alone robotic arms or complete robots), dolls, puppets, automated manufacturing systems, automated assembly systems, home appliances, home automation systems, cameras, water and irrigations systems, and adult entertainment devices (such as a vibrator).

Figure 4:
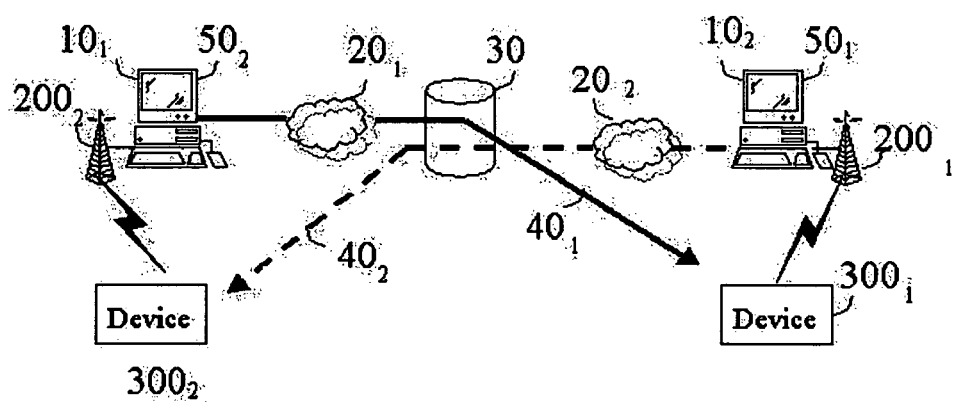

In an alternate embodiment, Computer 10 contains both the control panel and server side software and an attached Transmitter 50 and associated electromechanical device 300. In this alternate embodiment an individual can use a single computer to control a device in a remote location while, at the same time, receive signals and have a local device controlled by someone in a remote location. This example is shown in FIG. 4.

In an alternate embodiment, Computer 10 contains both the control panel and server side software and an attached Transmitter 50 and associated electromechanical device 300. In this alternate embodiment, an individual can use a single computer to control a wireless electromechanical device in the same location.

Figure 5:
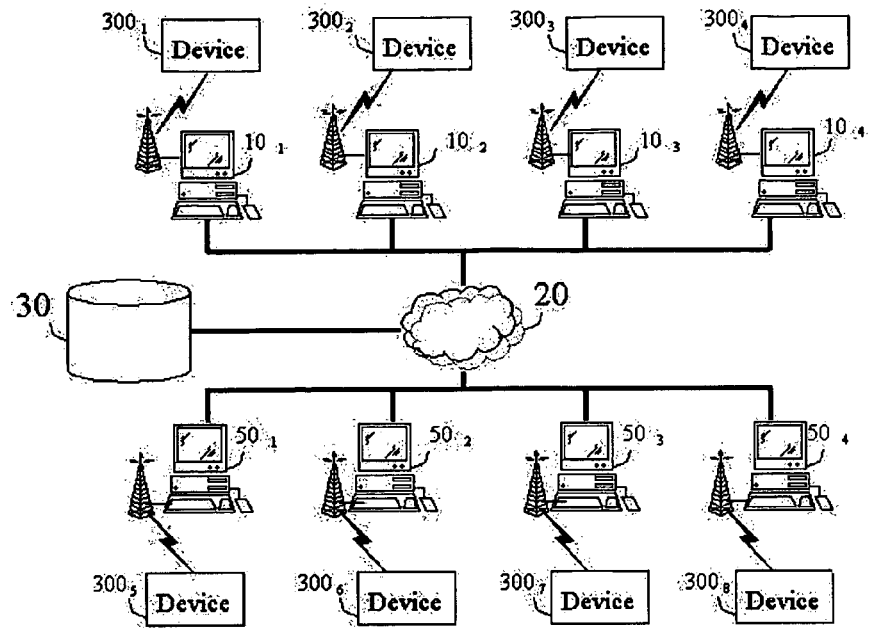
FIG. 5 is the logical extension of FIG. 4, where a multitude of computers take on the role of both first computer and second computer simultaneously sending and receiving signals to a large network of computers performing similar dual roles.

In an alternate embodiment, there are multiple instances of a computer serving a dual role both as 10 and 50. This single computer is then capable of controlling multiple devices in remote locations, while at the same time receiving control requests from remote locations that in turn control a device connected to the local computer. This is illustrated in FIG. 5.

In an alternate embodiment, the control information forwarded by server 30 is recorded for analysis or playback at a later date.

The end result is that someone can, with little training or education, control one or more electromechanically device(s) located one or more remote locations. Similarly, an individual can posses an electromechanical device that is controlled by one or more persons located in remote locations.

Appendix Item 1—Server Code

The "server side" software receives XML data from the graphical control panel and transforms the data into a format that can be sent to and accepted by the Transmitter.

The XML of the CONTROL structure looks like this:

```
<?xml version="1.0"?>
<!DOCTYPE control [
    <!ELEMENT device (channel, level)>
    <!ELEMENT channel (#PCDATA) >
    <!ELEMENT level (#PCDATA) >
]>
```

Where channel is the device to control (0 to N) and level is the state (0 for off, etc.)

EXAMPLE

```
<control>
    <device>
        <channel>0</channel>
        <level>4</level>
    </device>
</control>
```

The XML of the HEADER structure looks like this:

```
<?xml version="1.0"?>
<!DOCTYPE header [
    <!ELEMENT user (ID)>
    <!ELEMENT ID (#PCDATA) >
]>
```

EXAMPLE

```
<header>
    <user>
        <ID>123456789</ID>
    </user>
</header>
```

As many elements as needed may be added to this header to further identify the user.

The Basic logic of the server is as follows:

```
Begin Program;
{
    Initialize TCP/IP (use any available port);
    Initialize USB IO (for communication with our digital IO board);
    LOOP Waiting for incoming connections;
    {
        Process connection;
        Read HEADER* from new connection;
        Extract User ID;
        IF valid user ID then begin message loop
            While valid connection
            {
                Receive message and decode it;
                Verify decoded message;
                Write valid code to USB; Discard invalid message;
            }
        ELSE break connection;
    }
}
End Program;
```

The invention claimed is:

1. A system for controlling an electromechanical device comprising:
    a network;
    a first computer coupled to the network, the first computer executing a web browser representing a graphical control panel, the graphical control panel capable of receiving a command request from a first user;
    a second computer coupled to the network and a wireless transmitter, the second computer executing a software module capable of receiving the command request and sending the command request through the wireless transmitter;
    an electromechanical device for entertainment capable of receiving the command request from the wireless transmitter;
    wherein, the first user uses the graphical control panel on the first computer to send the command request over the network to the second computer;
    wherein the second computer receives the command request and wirelessly transmits the command request to the electromechanical device to entertain a second user;
    wherein the web browser executing on the first computer displays an animated representation of the electromechanical device, the animated representation mimicking the physical operation of the electromechanical device.

2. A system as recited in claim 1, wherein the transmitter is coupled to the second computer through a universal serial bus (USB) interface.

3. A system as recited in claim 1, further comprising:
    a third computer coupled to the network, the third computer executing a second web browser representing a second graphical control panel, the second graphical control panel capable of receiving a second command request from a third user,
    wherein the software module is capable of receiving the second command request and sending the second command request through the wireless transmitter,
    wherein, the third user uses the second graphical control panel on the third computer to send the second command request over the network to the second computer,
    wherein the second computer receives the second command request and wirelessly transmits the second command request to the electromechanical device to entertain the second user.

4. A system as recited in claim 3 further comprising:
one or more additional computers coupled to the network executing web browsers representing graphical control panels, the graphical control panels capable of receiving command requests from one or more additional users,
wherein the software module is capable of receiving the command requests and sending the command requests through the wireless transmitter,
wherein the one or more additional users use the graphical control panels on the one or more additional computers to send command requests over the network to the second computer,
wherein the second computer receives the command requests and wirelessly transmits the command requests to the electromechanical device to entertain the second user.

5. A system as recited in claim 4, wherein the server is coupled to the one or more computers, and the server is capable of receiving the command requests from the one or more additional computers and provide the command requests to the second computer.

6. A system as recited in claim 5, wherein the server includes logic able to determine which command request to send in the event of conflicting command requests.

7. A system as recited in claim 6, wherein the logic determines which command request to send to the software module by the number of command requests received for the command.

8. A system as recited in claim 1, wherein, in operation, the web browser is used to input desired behaviors which are displayed by the animated representation.

9. A system as recited in claim 1 further comprising, a server coupled to the first and second computer, the server capable of receiving the command request and transmitting the command request to the second computer over the network, the server configured to execute a server-side software configured to translate the command request received from the first computer into a wirelessly transmittable format for the second computer.

10. A system as recited in claim 9, wherein the server is able to serve a customizable web interface to the first computer, the customizable web interface capable of being used as an interface for controlling the electromechanical device.

11. A system as recited in claim 1, wherein the electromechanical device has a stimulation apparatus.

12. A system as recited in claim 11, wherein the stimulation apparatus is responsive to the command request.

13. A system as recited in claim 1 further comprising:
a second web browser representing a second graphical control panel, the second web browser executing on the second computer, the second graphical control panel capable of receiving a second command request from the second user;
a second wireless transmitter coupled to the first computer, the first computer executing a second software module capable of receiving the second command request and sending the second command request through the second wireless transmitter;
a second electromechanical device for entertainment capable of receiving the second command request from the second wireless transmitter;
wherein the second user uses the second graphical control panel on the second computer to send the second command request over the network to the first computer;
wherein the first computer receives the second command request and wirelessly transmits the second command request to the second electromechanical device to entertain the first user.

14. An electromechanical device comprising:
a communication device configured to receive a command from a remote computer transmitted over a network;
a command logic coupled to the communication device, the command logic capable of receiving the command from the communication device, and the command logic configured to apply the command;
a stimulation device coupled to the command logic and responsive to the applied command;
wherein, the stimulation device is configured to be applied to a user's body;
wherein, an animated representation of the electromechanical device is displayed on a web browser executing on the remote computer, the animated representation mimicking the physical operation of the electromechanical device.

15. An electromechanical device as recited in claim 14 further comprising, a feedback logic responsive to the state of the stimulation device, the feedback logic capable of sending information on the state of the stimulation device to the remote computer.

16. An electromechanical device as recited in claim 14, wherein the communication device receives the command request wirelessly from a local computer, wherein the local computer receives the command request from the remote computer.

17. A method for controlling an entertainment device comprising:
providing a first computer;
providing a second computer;
sending of a command request by a first user, the first user using a graphical browser interface through a web browser on the first computer;
receiving the command request by the second computer;
sending the command request wirelessly to the entertainment device;
applying the command by the entertainment device for the entertainment of a second user, wherein, the web browser on the first computer displaying an animated representation of the entertainment device, the animated representation mimicking the physical operation of the entertainment device.

18. A method as recited in claim 17, the entertainment provided is stimulation of the second users body.

* * * * *